US007437538B1

(12) United States Patent
Brooks et al.

(10) Patent No.: US 7,437,538 B1
(45) Date of Patent: Oct. 14, 2008

(54) APPARATUS AND METHOD FOR REDUCING EXECUTION LATENCY OF FLOATING POINT OPERATIONS HAVING SPECIAL CASE OPERANDS

(75) Inventors: Jeffrey S. Brooks, Austin, TX (US); Christopher H. Olson, Austin, TX (US)

(73) Assignee: Sun Microsystems, Inc., Santa Clara, CA (US)

( * ) Notice: Subject to any disclaimer, the term of this patent is extended or adjusted under 35 U.S.C. 154(b) by 493 days.

(21) Appl. No.: 10/881,763

(22) Filed: Jun. 30, 2004

(51) Int. Cl.
G06F 9/40 (2006.01)
(52) U.S. Cl. ..................................... 712/214
(58) Field of Classification Search ............. 712/214
See application file for complete search history.

(56) References Cited

U.S. PATENT DOCUMENTS

| 4,845,659 | A | | 7/1989 | Hrusecky |
|---|---|---|---|---|
| 4,879,676 | A | | 11/1989 | Hansen |
| 5,046,068 | A | | 9/1991 | Kubo et al. |
| 5,193,158 | A | | 3/1993 | Kinney et al. |
| 5,257,215 | A | | 10/1993 | Poon |
| 5,339,266 | A | | 8/1994 | Hinds et al. |
| 5,386,375 | A | | 1/1995 | Smith |
| 5,488,729 | A | * | 1/1996 | Vegesna et al. ............. 712/209 |
| 5,515,308 | A | | 5/1996 | Karp et al. |
| 5,546,593 | A | | 8/1996 | Kimura et al. |
| 5,548,545 | A | | 8/1996 | Brashears et al. |
| 5,559,977 | A | | 9/1996 | Avnon et al. |
| 5,619,439 | A | | 4/1997 | Yu et al. |
| 5,812,439 | A | | 9/1998 | Hansen |
| 5,867,724 | A | | 2/1999 | McMahon |
| 5,954,789 | A | | 9/1999 | Yu et al. |
| 6,076,157 | A | | 6/2000 | Borkenhagen et al. |
| 6,088,788 | A | | 7/2000 | Borkenhagen et al. |
| 6,088,800 | A | | 7/2000 | Jones et al. |
| 6,105,127 | A | | 8/2000 | Kimura et al. |

(Continued)

OTHER PUBLICATIONS

Standards Committee of the IEEE Computer Society, "An American National Standard IEEE Standard for Binary Floating-Point Arithmetic", 1985, IEEE.*

(Continued)

*Primary Examiner*—Eddie P Chan
*Assistant Examiner*—John Lindlof
(74) *Attorney, Agent, or Firm*—Robert C. Kowert; Anthony M. Petro; Meyertons, Hood, Kivlin, Kowert & Goetzel, P.C.

(57) ABSTRACT

An apparatus and method for floating-point special case handling. In one embodiment, a processor may include a first execution unit configured to execute a longer-latency floating-point instruction, and a second execution unit configured to execute a shorter-latency floating-point instruction. In response to the longer-latency floating-point instruction being issued to the first execution unit, the second execution unit may be further configured to detect whether a result of the longer-latency floating-point instruction is determinable from one or more operands of the longer-latency floating-point instruction independently of the first execution unit executing the longer-latency floating-point instruction. In response to detecting that the result is determinable, the second execution unit may be further configured to flush the longer-latency floating-point instruction from the first execution unit and to determine the result.

27 Claims, 6 Drawing Sheets

U.S. PATENT DOCUMENTS

| | | | |
|---|---|---|---|
| 6,131,104 | A | 10/2000 | Oberman |
| 6,212,544 | B1 | 4/2001 | Borkenhagen et al. |
| 6,219,778 | B1 | 4/2001 | Panwar et al. |
| 6,243,788 | B1 | 6/2001 | Franke et al. |
| 6,282,554 | B1 | 8/2001 | Abdallah et al. |
| 6,317,840 | B1 * | 11/2001 | Dean et al. .................. 713/320 |
| 6,341,347 | B1 | 1/2002 | Joy et al. |
| 6,349,319 | B1 | 2/2002 | Shankar et al. |
| 6,357,016 | B1 | 3/2002 | Rodgers et al. |
| 6,397,239 | B2 | 5/2002 | Oberman et al. |
| 6,415,308 | B1 | 7/2002 | Dhablania |
| 6,427,196 | B1 | 7/2002 | Adiletta et al. |
| 6,434,699 | B1 | 8/2002 | Jones et al. |
| 6,460,134 | B1 | 10/2002 | Blomgren et al. |
| 6,470,443 | B1 | 10/2002 | Emer et al. |
| 6,496,925 | B1 | 12/2002 | Rodgers et al. |
| 6,507,862 | B1 | 1/2003 | Joy et al. |
| 6,523,050 | B1 | 2/2003 | Dhablania et al. |
| 6,564,328 | B1 | 5/2003 | Grochowski et al. |
| 6,567,839 | B1 | 5/2003 | Borkenhagen et al. |
| 6,594,681 | B1 | 7/2003 | Prabhu |
| 6,625,654 | B1 | 9/2003 | Wolrich et al. |
| 6,629,236 | B1 | 9/2003 | Aipperspach et al. |
| 6,629,237 | B2 | 9/2003 | Wolrich et al. |
| 6,631,392 | B1 | 10/2003 | Jiang et al. |
| 6,633,895 | B1 | 10/2003 | Bass et al. |
| 6,651,158 | B2 | 11/2003 | Burns et al. |
| 6,668,308 | B2 | 12/2003 | Barroso et al. |
| 6,668,317 | B1 | 12/2003 | Bernstein et al. |
| 6,671,827 | B2 | 12/2003 | Guilford et al. |
| 6,681,345 | B1 | 1/2004 | Storino et al. |
| 6,687,838 | B2 | 2/2004 | Orenstien et al. |
| 6,694,347 | B2 | 2/2004 | Joy et al. |
| 6,694,425 | B1 | 2/2004 | Eickemeyer |
| 6,697,935 | B1 | 2/2004 | Borkenhagen et al. |
| 6,728,845 | B2 | 4/2004 | Adiletta et al. |
| 6,748,556 | B1 | 6/2004 | Storino et al. |
| 6,801,997 | B2 | 10/2004 | Joy et al. |
| 6,820,107 | B1 | 11/2004 | Kawai et al. |
| 6,847,985 | B1 | 1/2005 | Gupta et al. |
| 6,857,064 | B2 | 2/2005 | Smith et al. |
| 6,883,107 | B2 | 4/2005 | Rodgers et al. |
| 6,889,319 | B1 | 5/2005 | Rodgers et al. |
| 6,898,694 | B2 | 5/2005 | Kottapalli et al. |
| 7,143,412 | B2 | 11/2006 | Koenen |
| 2002/0156999 | A1 | 10/2002 | Eickemeyer et al. |
| 2003/0028759 | A1 | 2/2003 | Prabhu et al. |
| 2004/0059769 | A1 | 3/2004 | Cornea-Hasegan |

OTHER PUBLICATIONS

Kalla et al., IBM Power5 Chip: A Dual-Core Multithreaded Processor, IEEE MICRO, vol. 24, No. 2, Apr. 2004, pp. 40-47.

Sun Microsystems, "MAJC Architecture Tutorial. White Paper," Sep. 1999, pp. 1-31.

Sun Microsysems, "Introduction to Throughput Computing," Feb. 2003, pp. 1-18.

Kongetira, et al., "Niagara: A 32-Way Multithreaded Sparc Processor," IEEE Micro, vol. 25, No. 2, Apr. 2005, pp. 21-29.

U.S. Appl. No. 10/880,713, filed Jun. 30, 2004.

U.S. Appl. No. 10/880,488, filed Jun. 30, 2004.

Tulsen et al., "Power-sensitive multithreaded architecture," IEEE 2000, pp. 199-206.

Uhrig et al., "Hardware-based power management for real-time applications," Proceedings of the Second International Symposium on Parallel and Distributed Computing, IEEE 2003, 8 pages.

Tullsen, et al., "Simultaneous Multithreading: Maximizing On-Chip Parallelism," ISCA 1995, pp. 533-544.

Tullsen, et al., "Exploiting Choice: Instruction Fetch and Isssue on an Implementable Simultaneous Multithreading Processor," pp. 191-202, 1996.

Smith, "The End of Architecture," May 29, 1990, pp. 10-17.

Alverson et al., "Tera Hardware-Software Cooperation," 16 pages, 1997.

Ungerer et al., "A Survey of Processors with Explicit Multithreading," ACM Computing Surveys, vol. 35, No. 1, Mar. 2003, pp. 29-63.

Alverson et al., "The Tera Computer System," ACM 1990, 6 pages.

Alverson et al., "Exploiting Heterogenous Parallelism on a Multithreaded Multiprocessor," ACM 1992, pp. 188-197.

Uhrig, et al., "Implementing Real-Time Scheduling Within A Multithreaded Java Microcontroller," 8 pages. 2002.

Ide, et al., "A 320-MFLOPS CMOS Floating-Point Processing Unit for Superscalar Processors," IEEE 1993, 5 pages.

Nemawarkar, et al., "Latency Tolerance: A Metric for Performance Analysis of Multithreaded Architectures," IEEE 1997, pp. 227-232.

Baniasadi, et al., "Instruction Flow-Based Front-end Throttling for Power-Aware High-Performance Processors," ACM 2001, pp. 16-21.

Gura, et al., "An End-to-End Systems Approach to Elliptic Curve Cryptography," 16 pages. 2002.

Eberle, et al., "Cryptographic Processor for Arbitrary Elliptic Curves over $GF(2^m)$," 11 pages. 2003.

* cited by examiner

| | 0 | 1 | 2 | 3 | 4 | 5 | 6 | 7 |
|---|---|---|---|---|---|---|---|---|
| Fetch (F) | T0 | T3 | T6 | T2 | T7 | T5 | T1 | T4 |
| Cache (C) | | T0 | T3 | T6 | T2 | T7 | T5 | T1 |
| Pick (P) | | | T0 | T3 | T6 | T2 | T7 | T5 |
| Decode (D) | | | | T0 | T3 | T6 | T2 | T7 |
| Execute (E) | | | | | T0 | T3 | T6 | T2 |
| Memory (M) | | | | | | T0 | T3 | T6 |
| Bypass (B) | | | | | | | T0 | T3 |
| Writeback (W) | | | | | | | | T0 |
| Execution cycle | | | | | | | | |

*FIG. 3*

APPARATUS AND METHOD FOR REDUCING EXECUTION LATENCY OF FLOATING POINT OPERATIONS HAVING SPECIAL CASE OPERANDS

BACKGROUND OF THE INVENTION

1. Field of the Invention

This invention relates to processors and, more particularly, to execution of floating-point arithmetic instructions.

2. Description of the Related Art

In many processor implementations that include support for floating-point arithmetic, different types of floating-point instructions are provided with distinct and dedicated resources for execution, often in distinct execution pipelines. For example, common algorithms for evaluating divide and square-root instructions are iterative in nature and typically do not overlap well with other instructions such as addition and multiplication, particularly when the latter functions are pipelined. Consequently, divide and square root instructions may be implemented in one execution unit according to one pipeline, while other instructions may be implemented in another execution unit according to a different pipeline. However, completely segregating instruction implementation in this manner may result in increased implementation area due to the costs of providing independent resources to each execution unit, such as dedicated mantissa and exponent computation resources.

Additionally, in some embodiments, one set of separately implemented instructions may execute with longer latency than another. For example, some iterative division algorithms may produce only one or two quotient bits per execution cycle and are difficult to parallelize, in contrast to operations such as, e.g., multiplication. Depending on the frequency of occurrence of such longer-latency instructions, incurring the latency of completely executing an instruction where such latency is arithmetically unnecessary may degrade overall processor performance.

SUMMARY

Various embodiments of an apparatus and method for floating-point special case handling are disclosed. In one embodiment, a processor may include a first execution unit configured to execute a longer-latency floating-point instruction, and a second execution unit configured to execute a shorter-latency floating-point instruction. In response to the longer-latency floating-point instruction being issued to the first execution unit, the second execution unit may be further configured to detect whether a result of the longer-latency floating-point instruction is determinable from one or more operands of the longer-latency floating-point instruction independently of the first execution unit executing the longer-latency floating-point instruction. In response to detecting that the result is determinable, the second execution unit may be further configured to flush the longer-latency floating-point instruction from the first execution unit and to determine the result.

In one specific implementation of the processor, in response to the second execution unit determining the result, execution of the longer-latency floating-point instruction may complete in fewer execution cycles than if the first execution unit had determined the result.

A method is further contemplated that in one embodiment includes issuing a longer-latency floating-point instruction to a first execution unit, and in response to the longer-latency instruction issuing, detecting whether a result of the longer-latency floating-point instruction is determinable from one or more operands of the longer-latency floating-point instruction independently of the first execution unit executing the longer-latency floating-point instruction. The method may further include flushing the longer-latency floating-point instruction from the first execution unit and determining the result independently of the first execution unit, in response to detecting that the result is determinable.

BRIEF DESCRIPTION OF THE DRAWINGS

FIG. 3 is a pipeline diagram illustrating the flow of instructions through one embodiment of a processor core.

Figure 1:
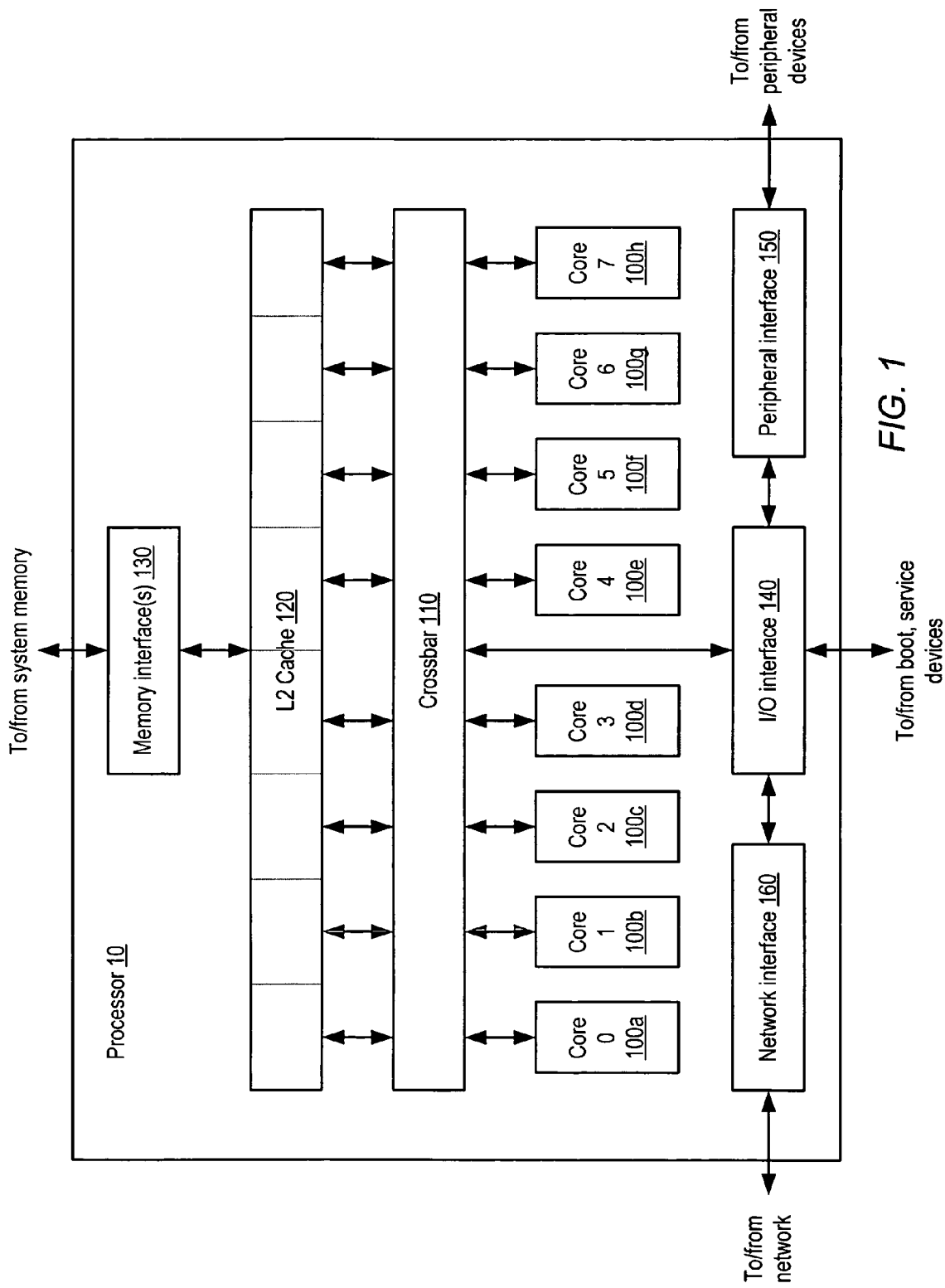
FIG. 1 is a block diagram illustrating one embodiment of a multithreaded processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS

Overview of Multithreaded Processor Architecture

A block diagram illustrating one embodiment of a multithreaded processor 10 is shown in FIG. 1. In the illustrated embodiment, processor 10 includes a plurality of processor cores 100*a-h*, which are also designated "core 0" though "core 7". Each of cores 100 is coupled to an L2 cache 120 via a crossbar 110. L2 cache 120 is coupled to one or more memory interface(s) 130, which are coupled in turn to one or more banks of system memory (not shown). Additionally, crossbar 110 couples cores 100 to input/output (I/O) interface 140, which is in turn coupled to a peripheral interface 150 and a network interface 160. As described in greater detail below, I/O interface 140, peripheral interface 150 and network interface 160 may respectively couple processor 10 to boot and/or service devices, peripheral devices, and a network.

Cores 100 may be configured to execute instructions and to process data according to a particular instruction set architecture (ISA). In one embodiment, cores 100 may be configured to implement the SPARC® V9 ISA, although in other embodiments it is contemplated that any desired ISA may be employed, such as x86, PowerPC® or MIPS®, for example. In the illustrated embodiment, each of cores 100 may be configured to operate independently of the others, such that all cores 100 may execute in parallel. Additionally, as described below in conjunction with the descriptions of FIG. 2 and FIG. 3, in some embodiments each of cores 100 may be configured to execute multiple threads concurrently, where a given thread may include a set of instructions that may execute independently of instructions from another thread. (For example, an individual software process, such as an application, may consist of one or more threads that may be scheduled for execution by an operating system.) Such a core 100 may also be referred to as a multithreaded (MT) core. In one embodiment, each of cores 100 may be configured to concurrently execute instructions from eight threads, for a total of 64 threads concurrently executing across processor 10. However, in other embodiments it is contemplated that other numbers of cores 100 may be provided, and that cores 100 may concurrently process different numbers of threads.

Crossbar 110 may be configured to manage data flow between cores 100 and the shared L2 cache 120. In one embodiment, crossbar 110 may include logic (such as multiplexers or a switch fabric, for example) that allows any core 100 to access any bank of L2 cache 120, and that conversely allows data to be returned from any L2 bank to any core 100. Crossbar 110 may be configured to concurrently process data requests from cores 100 to L2 cache 120 as well as data responses from L2 cache 120 to cores 100. In some embodiments, crossbar 110 may include logic to queue data requests and/or responses, such that requests and responses may not block other activity while waiting for service. Additionally, in one embodiment crossbar 110 may be configured to arbitrate conflicts that may occur when multiple cores 100 attempt to access a single bank of L2 cache 120 or vice versa.

L2 cache 120 may be configured to cache instructions and data for use by cores 100. In the illustrated embodiment, L2 cache 120 may be organized into eight separately addressable banks that may each be independently accessed, such that in the absence of conflicts, each bank may concurrently return data to a respective core 100. In some embodiments, each individual bank may be implemented using set-associative or direct-mapped techniques. For example, in one embodiment, L2 cache 120 may be a 4 megabyte (MB) cache, where each 512 kilobyte (KB) bank is 16-way set associative with a 64-byte line size, although other cache sizes and geometries are possible and contemplated. L2 cache 120 may be implemented in some embodiments as a writeback cache in which written (dirty) data may not be written to system memory until a corresponding cache line is evicted.

In some embodiments, L2 cache 120 may implement queues for requests arriving from and results to be sent to crossbar 110. Additionally, in some embodiments L2 cache 120 may implement a fill buffer configured to store fill data arriving from memory interface 130, a writeback buffer configured to store dirty evicted data to be written to memory, and/or a miss buffer configured to store L2 cache accesses that cannot be processed as simple cache hits (e.g., L2 cache misses, cache accesses matching older misses, accesses such as atomic operations that may require multiple cache accesses, etc.). L2 cache 120 may variously be implemented as single-ported or multiported (i.e., capable of processing multiple concurrent read and/or write accesses). In either case, L2 cache 120 may implement arbitration logic to prioritize cache access among various cache read and write requesters.

Memory interface 130 may be configured to manage the transfer of data between L2 cache 120 and system memory, for example in response to L2 fill requests and data evictions. In some embodiments, multiple instances of memory interface 130 may be implemented, with each instance configured to control a respective bank of system memory. Memory interface 130 may be configured to interface to any suitable type of system memory, such as Fully Buffered Dual Inline Memory Module (FB-DIMM), Double Data Rate or Double Data Rate 2 Synchronous Dynamic Random Access Memory (DDR/DDR2 SDRAM), or Rambus® DRAM (RDRAM®), for example. In some embodiments, memory interface 130 may be configured to support interfacing to multiple different types of system memory.

In the illustrated embodiment, processor 10 may also be configured to receive data from sources other than system memory. I/O interface 140 may be configured to provide a central interface for such sources to exchange data with cores 100 and/or L2 cache 120 via crossbar 110. In some embodiments, I/O interface 140 may be configured to coordinate Direct Memory Access (DMA) transfers of data between network interface 160 or peripheral interface 150 and system memory via memory interface 130. In addition to coordinating access between crossbar 110 and other interface logic, in one embodiment I/O interface 140 may be configured to couple processor 10 to external boot and/or service devices. For example, initialization and startup of processor 10 may be controlled by an external device (such as, e.g., a Field Programmable Gate Array (FPGA)) that may be configured to provide an implementation- or system-specific sequence of boot instructions and data. Such a boot sequence may, for example, coordinate reset testing, initialization of peripheral devices and initial execution of processor 10, before the boot process proceeds to load data from a disk or network device. Additionally, in some embodiments such an external device may be configured to place processor 10 in a debug, diagnostic, or other type of service mode upon request.

Peripheral interface 150 may be configured to coordinate data transfer between processor 10 and one or more peripheral devices. Such peripheral devices may include, without limitation, storage devices (e.g., magnetic or optical media-based storage devices including hard drives, tape drives, CD drives, DVD drives, etc.), display devices (e.g., graphics subsystems), multimedia devices (e.g., audio processing subsystems), or any other suitable type of peripheral device. In one embodiment, peripheral interface 150 may implement one or more instances of an interface such as Peripheral Component Interface Express (PCI Express™), although it is contemplated that any suitable interface standard or combination of standards may be employed. For example, in some embodiments peripheral interface 150 may be configured to implement a version of Universal Serial Bus (USB) protocol or IEEE 1394 (Firewire®) protocol in addition to or instead of PCI Express™.

Network interface 160 may be configured to coordinate data transfer between processor 10 and one or more devices (e.g., other computer systems) coupled to processor 10 via a network. In one embodiment, network interface 160 may be configured to perform the data processing necessary to implement an Ethernet (IEEE 802.3) networking standard such as Gigabit Ethernet or 10-Gigabit Ethernet, for example, although it is contemplated that any suitable networking standard may be implemented. In some embodiments, network interface 160 may be configured to implement multiple discrete network interface ports.

Overview of Fine-Grained Multithreading Processor Core

As mentioned above, in one embodiment each of cores 100 may be configured for multithreaded execution. More specifically, in one embodiment each of cores 100 may be configured to perform fine-grained multithreading, in which each core may select instructions to execute from among a pool of instructions corresponding to multiple threads, such that instructions from different threads may be scheduled to execute adjacently. For example, in a pipelined embodiment of core 100 employing fine-grained multithreading, instructions from different threads may occupy adjacent pipeline stages, such that instructions from several threads may be in various stages of execution during a given core processing cycle.

Figure 2:
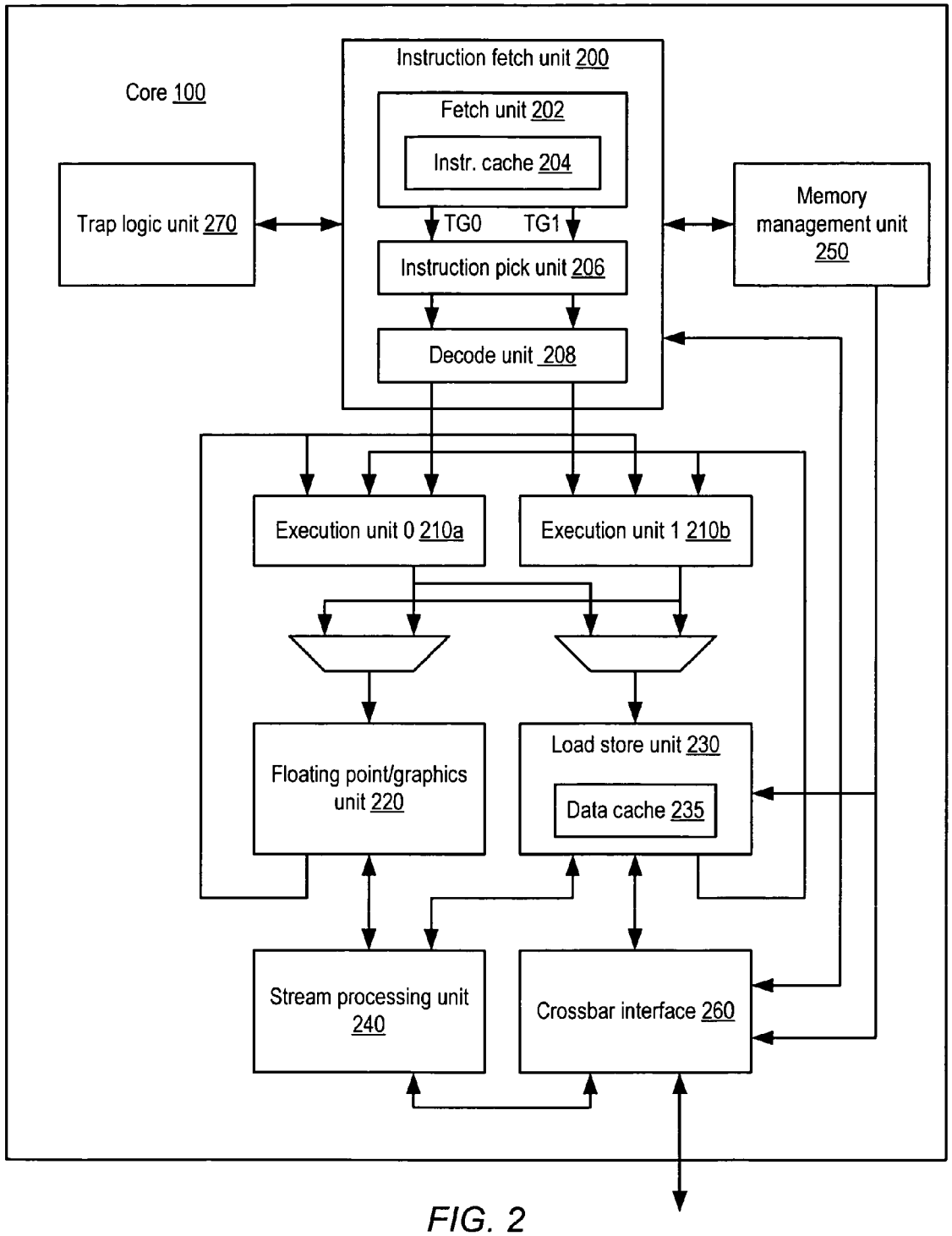
FIG. 2 is a block diagram illustrating one embodiment of a processor core configured to perform fine-grained multi-threading.

One embodiment of core 100 configured to perform fine-grained multithreading is illustrated in FIG. 2. In the illustrated embodiment, core 100 includes an instruction fetch unit (IFU) 200 coupled to a memory management unit (MMU) 250, a crossbar interface 260, a trap logic unit (TLU) 270, and a plurality of execution units (EXU0, EXU1) 210a-b. (Execution units 210a-b may also be referred to generically as EXUs 210.) Each of execution units 210a-b is coupled to both a floating point/graphics unit (FGU) 220 and a load store unit (LSU) 230. Each of the latter units is also coupled to send data back to each of execution units 210a-b. Both FGU 220 and LSU 230 are coupled to a stream processing unit (SPU) 240. Additionally, LSU 230, SPU 240 and MMU 250 are coupled to crossbar interface 260, which is in turn coupled to crossbar 110 shown in FIG. 1.

Instruction fetch unit 200 may be configured to provide instructions to the rest of core 100 for execution. In the illustrated embodiment, IFU 200 includes a fetch unit 202, an instruction pick unit 206, and a decode unit 208. Fetch unit 202 further includes an instruction cache 204. In one embodiment, fetch unit 202 may include logic to maintain fetch addresses (e.g., derived from program counters) corresponding to each thread being executed by core 100, and to coordinate the retrieval of instructions from instruction cache 204 according to those fetch addresses. In some embodiments, instruction cache 202 may include fewer access ports than the number of threads executable on core 100, in which case fetch unit 202 may implement arbitration logic configured to select one or more threads for instruction fetch during a given execution cycle. For example, fetch unit 202 may implement a least-recently-fetched algorithm to select a thread to fetch. Fetch unit 202 may also implement logic to handle instruction cache misses and translation of virtual instruction fetch addresses to physical addresses (e.g., fetch unit 202 may include an Instruction Translation Lookaside Buffer (ITLB)). Additionally, in some embodiments fetch unit 202 may include logic to predict branch outcomes and/or fetch target addresses, such as a Branch History Table (BHT), Branch Target Buffer (BTB), or other suitable structure, for example.

In one embodiment, fetch unit 202 may be configured to maintain a pool of fetched, ready-for-issue instructions drawn from among each of the threads being executed by core 100. For example, fetch unit 202 may implement a respective instruction buffer corresponding to each thread in which several recently-fetched instructions from the corresponding thread may be stored. In one embodiment, instruction pick unit 206 may be configured to select one or more instructions to be decoded and issued to execution units 210. In the illustrated embodiment, the threads fetched by fetch unit 202 may be divided into two thread groups denoted TG0 and TG1 (for example, if core 100 implements eight threads, each of TG0 and TG1 may include four threads).

Pick unit 206, in the illustrated embodiment, may be configured to attempt to select one instruction to schedule for execution from each of TG0 and TG1, such that two instructions may be selected for execution during a given execution cycle. For example, pick unit 206 may employ a least-recently-picked (LRP) algorithm in which the least recently picked thread within a given thread group that is ready for execution is selected. It is noted that in one embodiment, thread fetching as performed by fetch unit 202 and instruction selection as performed by pick unit 206 may be largely independent of one another. In some embodiments, pick unit 206 may schedule instructions before all factors affecting instruction scheduling are known (e.g., instruction dependencies, implementation-specific resource hazards, etc.), in which case a picked instruction may be canceled at a later execution stage. In other embodiments, it is contemplated that other instruction selection algorithms may be employed, including algorithms that take additional instruction scheduling factors into account. Further, it is contemplated that in some embodiments, pick unit 206 may be configured to select more than two instructions for execution in a given execution cycle, or may select instructions from all threads rather than specific groups of threads. Additionally, in one embodiment pick unit 206 may be configured to identify source operand dependencies that a given picked instruction may have on a previously issued instruction, and may configure other logic to appropriately select source operands (e.g., from a register file, or from a previous execution cycle via bypass logic).

Decode unit 208 may be configured to further prepare instructions selected by pick unit 206 for execution. In the illustrated embodiment, decode unit 208 may be configured to identify the specific type of a given instruction, such as whether the instruction is an integer, floating point, load/store, or other type of instruction, as well as to identify operands required by the given instruction. Additionally, in one embodiment decode unit 208 may be configured to detect and respond to scheduling hazards not detected during operation of pick unit 206. For example, in the illustrated embodiment, only one load store unit 230 is provided. Consequently, if two load/store-type instructions were picked for execution, decode unit 208 may be configured to cancel or stall one of those instructions and allow the other to be issued. In such an embodiment, decode unit 208 may employ an arbitration algorithm to determine which instruction to issue without favoring a particular thread or thread group. Numerous other types of scheduling and resource hazards detectable by decode unit 208 are possible and contemplated.

In some embodiments, instructions from a given thread may be speculatively issued from decode unit 208 for execution. For example, a given instruction from a certain thread may fall in the shadow of a conditional branch instruction from that same thread that was predicted to be taken or not-taken, or a load instruction from that same thread that was predicted to hit in data cache 235, but for which the actual outcome has not yet been determined. In such embodiments, after receiving notice of a misspeculation such as a branch misprediction or a load miss, IFU 200 may be configured to cancel misspeculated instructions from a given thread as well as issued instructions from the given thread that are dependent on or subsequent to the misspeculated instruction, and to redirect instruction fetch appropriately.

Execution units 210a-b may be configured to execute and provide results for certain types of instructions issued from IFU 200. In one embodiment, each of EXUs 210 may be similarly or identically configured to execute certain integer-type instructions defined in the implemented ISA, such as arithmetic, logical, and shift instructions. In the illustrated embodiment, EXU0 210a may be configured to execute integer instructions issued from TG0, while EXU1 210b may be configured to execute integer instructions issued from TG1. Further, each of EXUs 210 may include an integer register file configured to store register state information for all threads in its respective thread group. For example, if core 100 implements eight threads 0-7 where threads 0-3 are bound to TG0 and threads 4-7 are bound to TG1, EXU0 210a may store integer register state for each of threads 0-3 while EXU1 210b may store integer register state for each of threads 4-7. It is contemplated that in some embodiments, core 100 may include more or fewer than two EXUs 210, and EXUs 210 may or may not be symmetric in functionality. Also, in some embodiments EXUs 210 may not be bound to specific thread groups or may be differently bound than just described. Finally, in the illustrated embodiment instructions destined for FGU 220 or LSU 230 pass through one of EXUs 210. However, in alternative embodiments it is contemplated that such instructions may be issued directly from IFU 200 to their respective units without passing through one of EXUs 210.

Floating point/graphics unit 220 may be configured to execute and provide results for certain floating-point and graphics-oriented instructions defined in the implemented ISA. For example, in one embodiment FGU 220 may implement single- and double-precision floating-point arithmetic instructions compliant with a version of the Institute of Electrical and Electronics Engineers (IEEE) 754 Standard for Binary Floating-Point Arithmetic (more simply referred to as the IEEE 754 standard), such as add, subtract, multiply, divide, and certain transcendental functions. Also, in one embodiment FGU 220 may implement partitioned-arithmetic and graphics-oriented instructions defined by a version of the SPARC® Visual Instruction Set (VIS™) architecture, such as VIS™ 2.0. Additionally, in one embodiment FGU 220 may implement certain integer instructions such as integer multiply, divide, and population count instructions, and may be configured to perform multiplication operations on behalf of stream processing unit 240. Depending on the implementation of FGU 220, some instructions (e.g., some transcendental or extended-precision instructions) or instruction operand or result scenarios (e.g., certain denormal operands or expected results) may be trapped and handled or emulated by software.

In the illustrated embodiment, FGU 220 may be configured to store floating-point register state information for each thread in a floating-point register file. In one embodiment, FGU 220 may implement separate execution pipelines for floating point add/multiply, divide/square root, and graphics operations, while in other embodiments the instructions implemented by FGU 220 may be differently partitioned. In various embodiments, instructions implemented by FGU 220 may be fully pipelined (i.e., FGU 220 may be capable of starting one new instruction per execution cycle), partially pipelined, or may block issue until complete, depending on the instruction type. For example, in one embodiment floating-point add operations may be fully pipelined, while floating-point divide operations may block other divide/square root operations until completed.

Load store unit 230 may be configured to process data memory references, such as integer and floating-point load and store instructions as well as memory requests that may originate from stream processing unit 240. In some embodiments, LSU 230 may also be configured to assist in the processing of instruction cache 204 misses originating from IFU 200. LSU 230 may include a data cache 235 as well as logic configured to detect cache misses and to responsively request data from L2 cache 120 via crossbar interface 260. In one embodiment, data cache 235 may be configured as a write-through cache in which all stores are written to L2 cache 120 regardless of whether they hit in data cache 235; in some such embodiments, stores that miss in data cache 235 may cause an entry corresponding to the store data to be allocated within the cache. In other embodiments, data cache 235 may be implemented as a write-back cache.

In one embodiment, LSU 230 may include a miss queue configured to store records of pending memory accesses that have missed in data cache 235 such that additional memory accesses targeting memory addresses for which a miss is pending may not generate additional L2 cache request traffic. In the illustrated embodiment, address generation for a load/store instruction may be performed by one of EXUs 210. Depending on the addressing mode specified by the instruction, one of EXUs 210 may perform arithmetic (such as adding an index value to a base value, for example) to yield the desired address. Additionally, in some embodiments LSU 230 may include logic configured to translate virtual data addresses generated by EXUs 210 to physical addresses, such as a Data Translation Lookaside Buffer (DTLB).

Stream processing unit 240 may be configured to implement one or more specific data processing algorithms in hardware. For example, SPU 240 may include logic configured to support encryption/decryption algorithms such as Advanced Encryption Standard (AES), Data Encryption Standard/Triple Data Encryption Standard (DES/3DES), or Ron's Code #4 (RC4). SPU 240 may also include logic to implement hash or checksum algorithms such as Secure Hash Algorithm (SHA-1, SHA-256), Message Digest 5 (MD5), or Cyclic Redundancy Checksum (CRC). SPU 240 may also be configured to implement modular arithmetic such as modular multiplication, reduction and exponentiation. In one embodiment, SPU 240 may be configured to utilize the multiply array included in FGU 220 for modular multiplication. In various embodiments, SPU 240 may implement several of the aforementioned algorithms as well as other algorithms not specifically described.

SPU 240 may be configured to execute as a coprocessor independent of integer or floating-point instruction execution. For example, in one embodiment SPU 240 may be configured to receive operations and operands via control registers accessible via software; in the illustrated embodiment SPU 240 may access such control registers via LSU 230. In another embodiment SPU 240 may receive operations and operands decoded and issued from the instruction stream by IFU 200. In some embodiments, SPU 240 may be configured to freely schedule operations across its various algorithmic subunits independent of other functional unit activity. Additionally, SPU 240 may be configured to generate memory load and store activity. In the illustrated embodiment, SPU 240 may interact directly with crossbar interface 260 for such memory activity, while in other embodiments SPU 240 may coordinate memory activity through LSU 230. In one embodiment, software may poll SPU 240 through one or more control registers to determine result status and to retrieve ready results, for example by accessing additional control registers. In other embodiments, FGU 220, LSU 230 or other logic may be configured to poll SPU 240 at intervals to determine whether it has ready results to write back. In still other embodiments, SPU 240 may be configured to generate a trap when a result is ready, to allow software to coordinate result retrieval and processing.

As previously described, instruction and data memory accesses may involve translating virtual addresses to physical addresses. In one embodiment, such translation may occur on a page level of granularity, where a certain number of address bits comprise an offset into a given page of addresses, and the remaining address bits comprise a page number. For example, in an embodiment employing 4 MB pages, a 64-bit virtual address and a 40-bit physical address, 22 address bits (corresponding to 4 MB of address space, and typically the least significant address bits) may constitute the page offset. The remaining 42 bits of the virtual address may correspond to the virtual page number of that address, and the remaining 18 bits of the physical address may correspond to the physical page number of that address. In such an embodiment, virtual to physical address translation may occur by mapping a virtual page number to a particular physical page number, leaving the page offset unmodified.

Such translation mappings may be stored in an ITLB or a DTLB for rapid translation of virtual addresses during lookup of instruction cache 204 or data cache 235. In the event no translation for a given virtual page number is found in the appropriate TLB, memory management unit 250 may be configured to provide a translation. In one embodiment, MMU 250 may be configured to manage one or more translation tables stored in system memory and to traverse such tables (which in some embodiments may be hierarchically organized) in response to a request for an address translation, such as from an ITLB or DTLB miss. (Such a traversal may also be referred to as a page table walk.)

In some embodiments, if MMU 250 is unable to derive a valid address translation, for example if one of the memory pages including a necessary page table is not resident in physical memory (i.e., a page miss), MMU 250 may be configured to generate a trap to allow a memory management software routine to handle the translation. It is contemplated that in various embodiments, any desirable page size may be employed. Further, in some embodiments multiple page sizes may be concurrently supported.

A number of functional units in the illustrated embodiment of core 100 may be configured to generate off-core memory or I/O requests. For example, IFU 200 or LSU 230 may generate access requests to L2 cache 120 in response to their respective cache misses. SPU 240 may be configured to generate its own load and store requests independent of LSU 230, and MMU 250 may be configured to generate memory requests while executing a page table walk. Other types of off-core access requests are possible and contemplated. In the illustrated embodiment, crossbar interface 260 may be configured to provide a centralized interface to the port of crossbar 110 associated with a particular core 100, on behalf of the various functional units that may generate accesses that traverse crossbar 110. In one embodiment, crossbar interface 260 may be configured to maintain queues of pending crossbar requests and to arbitrate among pending requests to determine which request or requests may be conveyed to crossbar 110 during a given execution cycle. For example, crossbar interface 260 may implement a least-recently-used or other algorithm to arbitrate among crossbar requesters. In one embodiment, crossbar interface 260 may also be configured to receive data returned via crossbar 110, such as from L2 cache 120 or I/O interface 140, and to direct such data to the appropriate functional unit (e.g., data cache 235 for a data cache fill due to miss). In other embodiments, data returning from crossbar 110 may be processed externally to crossbar interface 260.

During the course of operation of some embodiments of core 100, exceptional events may occur. For example, an instruction from a given thread that is picked for execution by pick unit 206 may be not be a valid instruction for the ISA implemented by core 100 (e.g., the instruction may have an illegal opcode), a floating-point instruction may produce a result that requires further processing in software, MMU 250 may not be able to complete a page table walk due to a page miss, a hardware error (such as uncorrectable data corruption in a cache or register file) may be detected, or any of numerous other possible architecturally-defined or implementation-specific exceptional events may occur. In one embodiment, trap logic unit 270 may be configured to manage the handling of such events. For example, TLU 270 may be configured to receive notification of an exceptional event occurring during execution of a particular thread, and to cause execution control of that thread to vector to a supervisor-mode software handler (i.e., a trap handler) corresponding to the detected event. Such handlers may include, for example, an illegal opcode trap handler configured to return an error status indication to an application associated with the trapping thread and possibly terminate the application, a floating-point trap handler configured to fix up an inexact result, etc.

In one embodiment, TLU 270 may be configured to flush all instructions from the trapping thread from any stage of processing within core 100, without disrupting the execution of other, non-trapping threads. In some embodiments, when a specific instruction from a given thread causes a trap (as opposed to a trap-causing condition independent of instruction execution, such as a hardware interrupt request), TLU 270 may implement such traps as precise traps. That is, TLU 270 may ensure that all instructions from the given thread that occur before the trapping instruction (in program order) complete and update architectural state, while no instructions from the given thread that occur after the trapping instruction (in program order) complete or update architectural state.

Exemplary Core Pipeline Diagram

In the illustrated embodiment, core 100 may be configured for pipelined execution, in which processing of new instructions may begin before older instructions have completed, such that multiple instructions from various threads may be in various stages of processing during a given core execution cycle. A pipeline diagram illustrating the flow of integer instructions through one embodiment of core 100 is shown in FIG. 3. In the illustrated embodiment, execution of integer instructions is divided into eight stages, denoted Fetch (F), Cache (C), Pick (P), Decode (D), Execute (E), Memory (M), Bypass (B), and Writeback (W). In other embodiments, it is contemplated that different numbers of pipe stages corresponding to different types of functionality may be employed. It is further contemplated that other pipelines of different structure and depth may be implemented for integer or other instructions. For example, floating-point instructions may execute in a longer pipeline than integer instructions.

The first four stages of the illustrated integer pipeline may generally correspond to the functioning of IFU 200. In one embodiment, during the Fetch stage, one or more threads to fetch may be selected, and instruction cache 204 may be accessed for the selected thread. During the Cache stage, fetch unit 202 may determine whether the access of the previous cycle hit or missed the cache. If the access hit, the instructions read from the cache may be stored in instruction buffers. During the Pick stage, pick unit 206 may be configured in one embodiment to select at most two instructions to issue, one for each thread group as described above. Source dependencies of the selected instructions on previously issued instructions may also be detected during the Pick stage. During the Decode stage, decode unit 208 may be configured to decode the selected instructions and to determine whether resource hazards exist as described above. For integer operations, data operands may also be selected during the Decode stage. For example, operands may be retrieved from an integer register file, or bypass logic may be configured to bypass operands from another pipe stage.

During the Execute stage, one or both of execution units 210 may be active to compute an instruction result. If an instruction in the integer execution pipeline is not a load or store instruction, in the illustrated embodiment it may be idle during the Memory and Bypass stages before its result is committed (i.e., written back to the integer register file) in the Writeback stage. A load or store instruction may have its address calculated by one of execution units 210 during the Execute stage. During the Memory stage of a load instruction, data cache 235 may be accessed, while during the Bypass stage, LSU 230 may determine whether a data cache hit or miss occurred. In the hit case, data may be forwarded to the appropriate execution unit 210 (e.g., dependent on the thread group of the load instruction) to be committed during the Writeback stage. In one embodiment, store instructions and load instructions that miss data cache 235 may execute with different pipeline timing than shown in FIG. 3.

In the illustrated embodiment, integer instructions are depicted as executing back-to-back in the pipeline without stalls. In execution cycles 0 through 7, instructions from threads 0, 3, 6, 2, 7, 5, 1 and 4 enter the Fetch stage, respectively, though in other embodiments, instructions may issue from various threads in a different order according to the operation of pick unit 206. In some instances, other instructions issued prior to execution cycle 0 may also be in the pipeline. Additionally, in some embodiments, two different instructions from the same or different threads may execute during the same pipeline stage. For example, in the illustrated embodiment of core 100, one integer instruction may be issued to each of execution units 210 in a single cycle.

By execution cycle 7, it is noted that each stage of the pipeline holds an instruction from a different thread in a different stage of execution, in contrast to conventional processor implementations that typically require a pipeline flush when switching between threads or processes. In some embodiments, flushes and stalls due to resource conflicts or other scheduling hazards may cause some pipeline stages to have no instruction during a given cycle. However, in the fine-grained multithreaded processor implementation employed by the illustrated embodiment of core 100, such flushes and stalls may be directed to a single thread in the pipeline, leaving other threads undisturbed. Additionally, even if one thread being processed by core 100 stalls for a significant length of time (for example, due to an L2 cache miss), instructions from another thread may be readily selected for issue, thus increasing overall thread processing throughput.

Shorter-Latency and Longer-Latency Floating-Point Instructions

In some embodiments of core 100, different floating-point instructions may execute within different execution units having different characteristics. For example, more common floating-point instructions, such as addition and/or multiplication, may be implemented within a shorter-latency execution unit. Further, such shorter-latency instructions may be fully or partially pipelined to improve execution throughput; that is, a new instruction may begin execution before a previously started instruction completes executing. In some embodiments, shorter-latency instructions may be issued as frequently as once per execution cycle, or every other execution cycle. By contrast, less common and/or more computationally difficult floating-point instructions, such as division and/or square root, for example, may be implemented within a longer-latency execution unit. In some embodiments, instructions executing in a longer-latency execution unit may take a substantially greater number of cycles to complete than instructions executing in a shorter-latency execution unit. Further, in some embodiments, a longer-latency execution unit may not be pipelined, such that a new longer-latency instruction may not begin executing until a previously issued longer-latency instruction completes.

Figure 4:
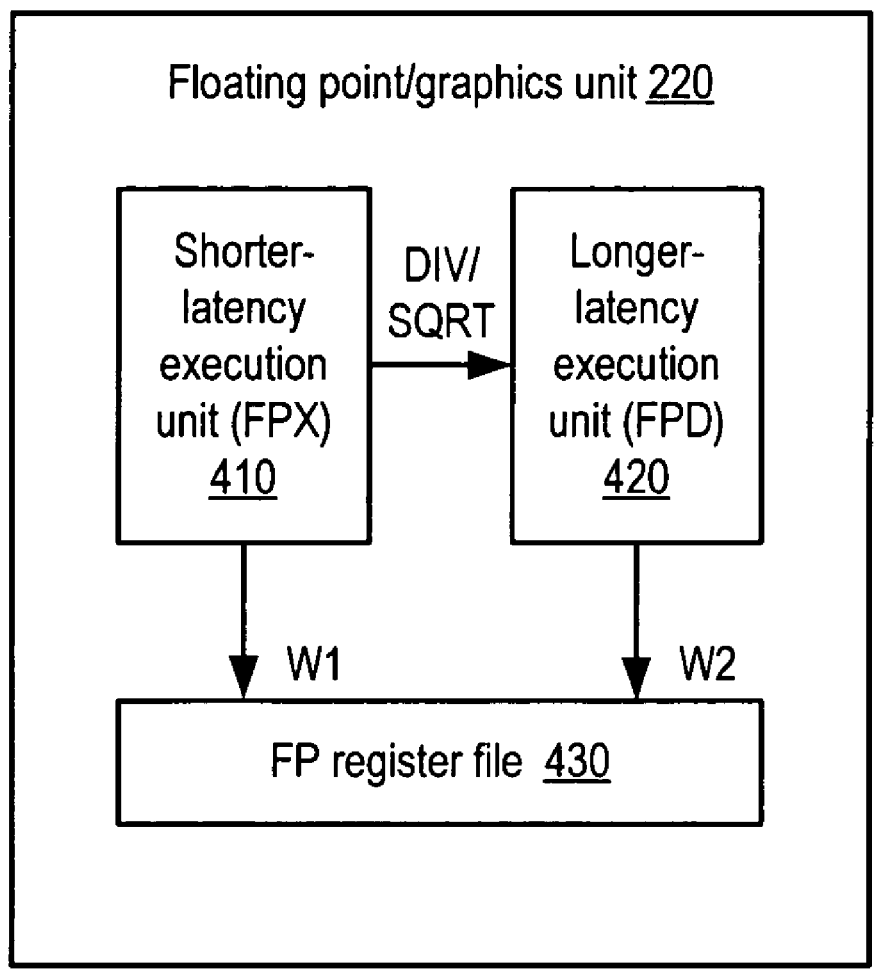
FIG. 4 is a block diagram illustrating one embodiment of a functional unit configured to provide different execution units for longer-latency and shorter-latency floating-point instructions.

One embodiment of FGU 220 in which different execution units are provided for different types of floating-point instructions is illustrated in FIG. 4. In the illustrated embodiment, FGU 220 includes a shorter-latency execution unit (FPX) 410 coupled to a longer-latency execution unit (FPD) 420. Additionally, each of FPX 410 and FPD 420 is coupled to a floating-point register file (FRF) 430 via a respective write port, designated W1 and W2. In some embodiments, FGU 220 may include additional execution units other than those shown.

In one embodiment, FPX 410 may be configured to execute single- and double-precision IEEE 754 floating-point addition/subtraction and multiplication instructions as shorter-latency instructions in a fixed-length pipeline. For example, FPX 410 may be configured to perform both mantissa and exponent result calculations for the implemented shorter-latency instructions, as well as required operand or result formatting (including normalization and rounding, for example), in five floating-point pipeline execution stages. Further, in one embodiment FPX 410 may be fully pipelined with single-cycle throughput (i.e., start/complete one instruction per cycle) for all floating-point instructions regardless of precision. However, it is contemplated that in other embodiments, different or additional instructions may be implemented in FPX 410 as shorter-latency instructions, and that FPX 410 may be configured to implement an execution pipeline of differing length and throughput characteristics. For example, in some embodiments throughput of certain double-precision arithmetic instructions may be less than throughput of single-precision instructions. In one embodiment, it is contemplated that FPX 410 may be configured to execute integer multiplication instructions as well as floating-point multiplication instructions.

In contrast to FPX 410, FPD 420 may be configured to execute longer-latency instructions. In one embodiment, FPD 420 may be configured to execute single- and double-precision IEEE 754 floating-point divide and square-root instructions, although in other embodiments additional or different longer-latency instructions may be implemented. In various embodiments, longer-latency instructions may execute in a greater number of cycles than the shorter-latency instructions implemented by FPX 410. For example, in one embodiment longer-latency instructions may incur a latency of 20-30 execution cycles, depending on precision, compared to five execution cycles for shorter-latency instructions. Further, in some embodiments longer-latency instructions may execute with variable latency. For example, in one embodiment FPD 420 may be configured to implement integer division as a longer-latency instruction for which the execution latency depends on the input operands. Additionally, in various embodiments longer-latency instructions executing in FPD 420 may or may not be pipelined. In unpipelined embodiments, a new instruction may not begin executing within FPD 420 until a previous instruction completes. Also, in some such embodiments, issue of a longer-latency instruction from a given thread may block further issue of instructions of any type from that thread until the longer-latency instruction completes.

In the illustrated embodiment, FRF 430 may be configured to store floating-point register state information for each of the threads implemented by core 100. For example, if the implemented ISA specifies that a given thread may address 32 64-bit floating-point registers and core 100 implements eight threads, FRF 430 may be configured to implement 256 64-bit floating-point registers as eight independent register namespaces. Additionally, in the illustrated embodiment FRF 430 provides two result write ports W1 and W2 and may be configured to write back one result per execution cycle from each write port. Thus, in the illustrated embodiment, both FPX 410 and FPD 420 may be configured to write a result to FRF 430 during a given execution cycle. FRF 430 may also include read ports (not shown) configured to supply read operands to FPX 410 and FPD 420 as well as other execution units. In other embodiments, FRF 430 may be organized differently. For example, FRF 430 may include a different number of registers corresponding to a different number of threads, and/or different numbers and configurations of read and write ports.

Special Case Detection and Early Result Computation

Depending on the types of longer-latency instructions implemented by FPD 420, special cases may exist in which the result of a given longer-latency instruction is determinable from one or more of the instruction's operands independently of the instruction's execution by FPD 420. Such a result may also be referred to herein as being independently determinable. For example, according to one version of IEEE 754 floating-point arithmetic, if the source of a square-root instruction or either source of a divide instruction is a Not-a-Number (NaN) data type, the result may be defined to be a NaN data type. Similarly, the result of zero divided by zero and infinity divided by infinity may be defined to be a NaN data type. (The latter cases as well as the case of a Signaling NaN (SNaN) source may also generate an invalid exception, which may cause a trap to software if enabled by a corresponding exception enable.) Numerous other cases (such as certain instances of zero or infinite results, and certain instances of underflow or overflow exception status) are contemplated in which a result and/or an exception status of a longer-latency instruction may be independently determinable.

In one embodiment, FPX 410 may be configured to detect that the result of a longer-latency instruction issued to FPD 420 is determinable from one or more instruction operands independently of FPD 420 executing that instruction. In some such embodiments, FPX 410 may be configured to flush the longer-latency instruction from FPD 420, and the result of the longer-latency instruction may be determined by FPX 410 instead. For example, in one embodiment FPX 410 may be configured to examine the mantissa, exponent and sign fields of both operands of a divide instruction issued to FPD 420. If FPX 410 identifies one of the special cases identified previously, or another special case not specifically noted, it may be configured to flush the divide instruction from FPD 420 and to generate the divide result and any relevant exception status information itself. In some embodiments, FPD 420 may be configured to begin executing a new longer-latency instruction as early as one execution cycle following the flush of a previously-issued longer-latency instruction by FPX 410.

As noted previously, in some embodiments, instructions executing in longer-latency execution unit FPD 420 may execute in a greater number of execution cycles than those instructions executing in shorter-latency execution unit FPX 410. By configuring FPX 410 to detect special cases of longer-latency instructions, to correspondingly flush such instructions from FPD 420 and to determine the longer-latency instruction result in the shorter-latency pipeline of FPX 410, execution of a longer-latency instruction may complete in fewer execution cycles than if FPD 420 had been allowed to determine the result, in instances where a special case is detected. For example, in one embodiment, a double-precision divide instruction may execute to completion in 30 cycles within FPD 420. In instances where FPX 410 identifies that the divide result is determinable from the divide operands without actually performing the division, FPX 410 may provide the divide result in five cycles. In some embodiments, reducing the latency of longer-latency operations in such cases, overall execution performance of core 100 may improve, for example by enabling FPD 420 to begin executing a new longer-latency instruction sooner. It is contemplated that depending on the implementation, other specific execution latencies may occur for longer-latency and shorter-latency instructions. Further, in various embodiments, both types of instructions may incur additional latency both within FGU 220 (e.g., due to result bypass and writeback pipeline stages) and external to FGU 220 (e.g., due to fetch, pick and decode stages such as illustrated in FIG. 3).

In some embodiments, FPX 410 may be configured to detect whether a longer-latency instruction's result is independently determinable concurrently with FPD 420 executing the longer-latency instruction. For example, in one embodiment, FPX 410 may be configured to receive all instructions issued to FGU 220, and subsequent to receiving a longer-latency instruction, may convey the longer-latency instruction to FPD 420 for execution (possibly one or more cycles after receiving the instruction) while processing the longer-latency instruction's operands to detect whether the result is independently determinable. In other embodiments, both FPX 410 and FPD 420 may be configured to concurrently receive a longer-latency instruction issued to FGU 220, or FPD 420 may be configured to receive longer-latency instructions and convey them to FPX 410.

Even if FPX 410 does not detect that the result of a given longer-latency instruction is independently determinable, in some embodiments, FPX 410 may be configured to participate in determining the result of the instruction. For example, in one embodiment FPX 410 may include logic for performing the exponent arithmetic portion of a shorter-latency instruction (e.g., summing exponents in the case of multiplication). In such an embodiment, FPX 410 may be configured to use such logic to perform the exponent arithmetic portion of longer-latency instructions. Specifically, when a longer-latency instruction is issued to FGU 220 and FPX 410 determines that its result is not independently determinable, FPX 410 may be configured to compute an exponent result of the longer-latency instruction. Correspondingly, in one embodiment FPD 420 may be configured to perform only the mantissa arithmetic portion of the longer-latency instruction, which may simplify the design of FPD 420.

Upon computing an exponent result for a given longer-latency instruction, in one embodiment FPX 410 may be configured to save the exponent result (e.g., in a register or buffer) until the mantissa portion of the longer-latency instruction completes execution in FPD 420. The saved exponent and the mantissa result may then be merged and written back to FRF 430, for example via write port W2. In embodiments where FPD 420 is nonpipelined (i.e., where FPD 420 completes execution of a given longer-latency instruction before beginning execution of another), only one exponent result computed by FPX 410 may need to be stored at any given time. It is contemplated that in some embodiments, even if mantissa computation for a longer-latency instruction in FPD 420 is nonpipelined, exponent computation for that instruction in FPX 410 may be pipelined, such that FPX 410 may accept a new shorter-latency instruction for execution as early as one execution cycle following issuance of a longer-latency instruction, in some cases. Further, it is contemplated that in some embodiments, FPX 410 may be configured to compute and store a resultant sign as well as an exponent result for a given longer-latency instruction.

As mentioned above, in some embodiments FPX 410 may be configured to determine an exception status of a longer-latency instruction in addition to detecting whether the result of the longer-latency instruction is independently determinable. For example, the IEEE 754 standard defines an invalid exception, an overflow exception, an underflow exception, and a divide-by-zero exception, in addition to other types of exceptions; some specific implementations of core 100 may identify additional types of exceptions that may be generated. In one embodiment, as part of examining operands of a longer-latency instruction to detect whether its result is independently determinable, FPX 410 may be configured to determine whether the instruction generates an exception. For example, if the divisor of a divide instruction is equal to zero, FPX 410 may determine that a divide-by-zero exception should be generated. In some embodiments, if a given longer-latency instruction can generate more than one type of exception, FPX 410 may be configured to select a highest-priority exception to generate. Additionally, in some embodiments individual exception types may have corresponding software-programmable enables, for example implemented within one or more control registers in FGU 220 or another functional unit. In such embodiments, FPX 410 may be configured to qualify its exception status determination with an appropriate exception enable, such that a software trap to handle a particular exception may occur only if the particular exception is enabled. In various embodiments, if FPX 410 determines that a disabled exception has occurred, the exception may be ignored or flagged, for example in a status register.

Figure 5:
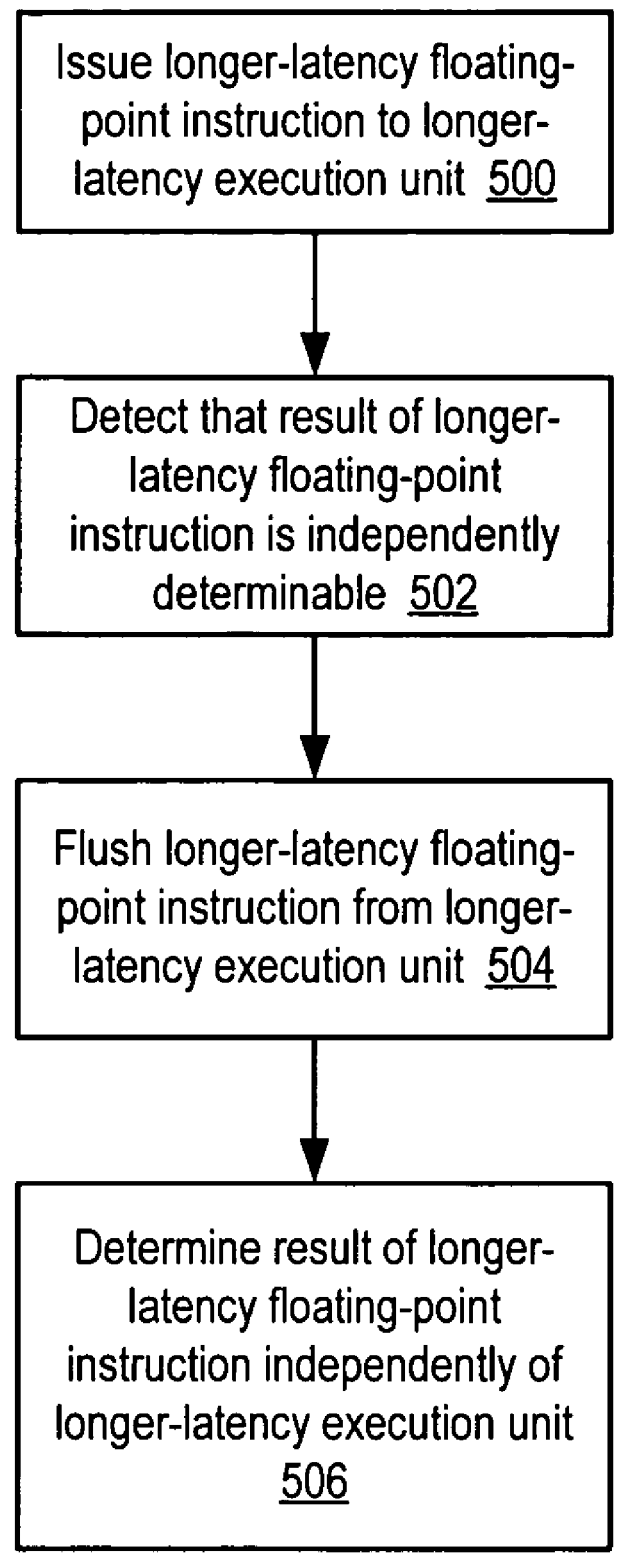
FIG. 5 is a flow diagram illustrating one embodiment of a method of executing longer-latency floating-point instructions.

One embodiment of a method of executing longer-latency floating-point instructions is illustrated in FIG. 5. Referring collectively to FIG. 1 through FIG. 5, operation begins in block 500 where a longer-latency floating-point instruction is issued to a longer-latency execution unit. For example, in one embodiment IFU 200 may issue a longer-latency floating-point instruction to be executed by FPD 420 within FGU 220. In response to the longer-latency instruction issuing, the result of the longer-latency instruction is detected to be determinable from one or more of its operands independently of executing the instruction (block 502). For example, in one embodiment FPX 410 may be configured to examine the mantissa, exponent and sign fields of a longer-latency instruction's operands to detect whether the result is independently determinable as described above.

In response to detecting that the result of the longer-latency instruction is independently determinable, the longer-latency instruction is flushed from the longer-latency execution unit (block 504). For example, in one embodiment FPX 410 may be configured to flush an independently determinable longer-latency instruction from FPD 420. Additionally, the result of the longer-latency instruction is determined, for example by FPX 410, independently of the longer-latency execution unit (block 506). In some embodiments, FPX 410 may be configured to determine an exception status of the longer-latency instruction in addition to detecting whether its result is independently determinable, as described above. Also, in some embodiments, flushing and result determination may occur concurrently or in a different order.

Exemplary System Embodiment

Figure 6:
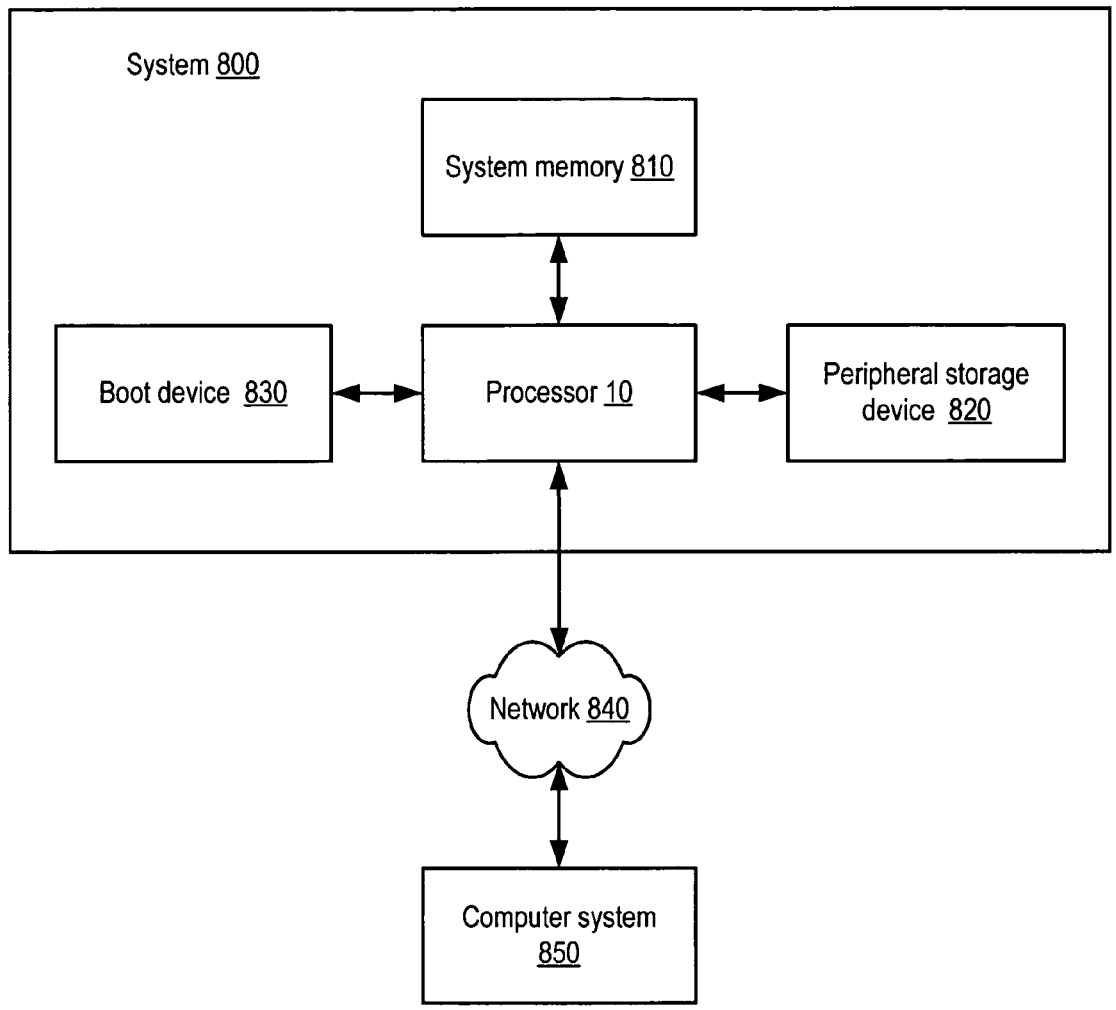
FIG. 6 is a block diagram illustrating one embodiment of a system including a multithreaded processor.

As described above, in some embodiments processor 10 of FIG. 1 may be configured to interface with a number of external devices. One embodiment of a system including processor 10 is illustrated in FIG. 6. In the illustrated embodiment, system 800 includes an instance of processor 10 coupled to a system memory 810, a peripheral storage device 820 and a boot device 830. System 800 is coupled to a network 840, which is in turn coupled to another computer system 850. In some embodiments, system 800 may include more than one instance of the devices shown, such as more than one processor 10, for example. In various embodiments, system 800 may be configured as a rack-mountable server system, a standalone system, or in any other suitable form factor. In some embodiments, system 800 may be configured as a client system rather than a server system.

In various embodiments, system memory 810 may comprise any suitable type of system memory as described above, such as FB-DIMM, DDR/DDR2 SDRAM, or RDRAM®, for example. System memory 810 may include multiple discrete banks of memory controlled by discrete memory interfaces in embodiments of processor 10 configured to provide multiple memory interfaces 130. Also, in some embodiments system memory 810 may include multiple different types of memory.

Peripheral storage device 820, in various embodiments, may include support for magnetic, optical, or solid-state storage media such as hard drives, optical disks, nonvolatile RAM devices, etc. In some embodiments, peripheral storage device 820 may include more complex storage devices such as disk arrays or storage area networks (SANs), which may be coupled to processor 10 via a standard Small Computer System Interface (SCSI), a Fibre Channel interface, a Firewire® (IEEE 1394) interface, or another suitable interface. Additionally, it is contemplated that in other embodiments, any other suitable peripheral devices may be coupled to processor 10, such as multimedia devices, graphics/display devices, standard input/output devices, etc.

As described previously, in one embodiment boot device 830 may include a device such as an FPGA or ASIC configured to coordinate initialization and boot of processor 10, such as from a power-on reset state. Additionally, in some embodiments boot device 830 may include a secondary computer system configured to allow access to administrative functions such as debug or test modes of processor 10.

Network 840 may include any suitable devices, media and/or protocol for interconnecting computer systems, such as wired or wireless Ethernet, for example. In various embodiments, network 840 may include local area networks (LANs), wide area networks (WANs), telecommunication networks, or other suitable types of networks. In some embodiments, computer system 850 may be similar to or identical in configuration to illustrated system 800, whereas in other embodiments, computer system 850 may be substantially differently configured. For example, computer system 850 may be a server system, a processor-based client system, a stateless "thin" client system, a mobile device, etc.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A processor, comprising: a first execution unit configured to execute a longer-latency floating-point instruction, wherein said longer-latency floating-point instruction defines a floating-point computation to be performed on one or more operands; and a second execution unit configured to execute a shorter-latency floating-point instruction;

wherein said longer-latency floating-point instruction is configured to execute in a greater number of execution cycles than said shorter-latency floating-point instruction;

wherein in response to said longer-latency floating-point instruction being issued to said first execution unit, said second execution unit is further configured to detect from one or more operands of said longer-latency floating-point instruction whether a result of said longer-latency floating-point instruction is determinable without actually performing said floating-point computation to completion; and wherein in response to detecting that said result is determinable, said second execution unit is further configured to flush said longer-latency floating-point instruction from said first execution unit and to determine said result.

2. The processor as recited in claim 1, wherein in response to said second execution unit determining said result, execution of said longer-latency floating-point instruction completes in fewer execution cycles than if said first execution unit had determined said result.

3. The processor as recited in claim 1, wherein said second execution unit detecting whether said result is determinable occurs concurrently with said first execution unit executing said longer-latency floating-point instruction.

4. The processor as recited in claim 1, wherein said first execution unit is configured to execute floating-point division or square root instructions.

5. The processor as recited in claim 1, wherein said second execution unit is configured to execute floating-point addition or multiplication instructions.

6. The processor as recited in claim 1, wherein said second execution unit is further configured to determine an exception status of said longer-latency floating-point instruction in response to detecting that said result of said longer-latency instruction is determinable without actually performing said floating-point computation to completion.

7. The processor as recited in claim 1, wherein said first execution unit is further configured to perform a mantissa arithmetic portion of said longer-latency floating-point instruction, and wherein said second execution unit is further configured to perform an exponent arithmetic portion of said longer-latency floating-point instruction.

8. The processor as recited in claim 1, wherein execution behavior of said longer-latency and said shorter-latency floating point instructions is defined according to Institute of Electrical and Electronics Engineers (IEEE)754-1985 Standard for Binary Floating-Point Arithmetic.

9. The processor as recited in claim 1, further comprising instruction fetch logic configured to issue a first instruction from one of a plurality of threads during one execution cycle and to issue a second instruction from another one of said plurality of threads during a successive execution cycle.

10. A method, comprising: issuing a longer-latency floating-point instruction to a first execution unit, wherein said longer-latency floating-Point instruction defines a floating-point computation to be performed on one or more operands;

in response to said issuing, detecting from one or more operands of said longer-latency floating-point instruction whether a result of said longer-latency floating-point instruction is determinable without actually performing said floating-point computation to completion; and in response to detecting that said result is determinable, flushing said longer-latency floating-point instruction from said first execution unit and determining said result independently of said first execution unit.

11. The method as recited in claim 10, wherein in response to determining said result independent of said first execution unit, execution of said longer-latency floating-point instruction completes in fewer execution cycles than if said first execution unit had determined said result.

12. The method as recited in claim 10, wherein detecting whether said result is determinable occurs concurrently with said first execution unit executing said longer-latency floating-point instruction.

13. The method as recited in claim 10, wherein said first execution unit is configured to execute floating-point division or square root instructions.

14. The method as recited in claim 10, further comprising executing a shorter-latency floating-point instruction in a second execution unit, wherein said shorter-latency floating-point instruction includes a floating-point addition or multiplication instruction, and wherein said longer-latency floating-point instruction is configured to execute in a greater number of execution cycles than said shorter-latency floating-point instruction.

15. The method as recited in claim 14, further comprising performing a mantissa arithmetic portion of said longer-latency floating-point instruction in said first execution unit, and performing an exponent arithmetic portion of said longer-latency floating-point instruction in said second execution unit.

16. The method as recited in claim 14, wherein execution behavior of said longer-latency and said shorter-latency floating point instructions is defined according to Institute of Electrical and Electronics Engineers (IEEE)754-1985 Standard for Binary Floating-Point Arithmetic.

17. The method as recited in claim 10, further comprising determining an exception status of said longer-latency floating-point instruction in response to detecting that said result of said longer-latency instruction is determinable without actually performing said floating-point computation to completion.

18. The method as recited in claim 10, further comprising:
issuing a first instruction from one of a plurality of threads during one execution cycle; and
issuing a second instruction from another one of said plurality of threads during a successive execution cycle.

19. A system, comprising: a system memory; and a processor coupled to said system memory, wherein said processor comprises: a first execution unit configured to execute a longer-latency floating-point instruction, wherein said longer-latency floating-point instruction defines a floating-point computation to be performed on one or more operands; and a second execution unit configured to execute a shorter-latency floating-point instruction;

wherein said longer-latency floating-point instruction is configured to execute in a greater number of execution cycles than said shorter-latency floating-point instruction;

wherein in response to said longer-latency floating-point instruction being issued to said first execution unit, said second execution unit is further configured to detect from one or more operands of said longer-latency floating-point instruction whether a result of said longer-latency floating-point instruction is determinable without actually performing said floating-point computation to completion; and wherein in response to detecting that said result is determinable, said second execution unit is further configured to flush said longer-latency floating-point instruction from said first execution unit and to determine said result.

20. The system as recited in claim 19, wherein in response to said second execution unit determining said result, execution of said longer-latency floating-point instruction completes in fewer execution cycles than if said first execution unit had determined said result.

21. The system as recited in claim 19, wherein said second execution unit detecting whether said result is determinable occurs concurrently with said first execution unit executing said longer-latency floating-point instruction.

22. The system as recited in claim 19, wherein said first execution unit is configured to execute floating-point division or square root instructions.

23. The system as recited in claim 19, wherein said second execution unit is configured to execute floating-point addition or multiplication instructions.

24. The system as recited in claim 19, wherein said second execution unit is further configured to determine an exception status of said longer-latency floating-point instruction in response to detecting that said result of said longer-latency instruction is determinable without actually performing said floating-point computation to completion.

25. The system as recited in claim 19, wherein said first execution unit is further configured to perform a mantissa arithmetic portion of said longer-latency floating-point instruction, and wherein said second execution unit is further configured to perform an exponent arithmetic portion of said longer-latency floating-point instruction.

26. The system as recited in claim 19, wherein execution behavior of said longer-latency and said shorter-latency floating point instructions is defined according to Institute of Electrical and Electronics Engineers (IEEE)754-1985 Standard for Binary Floating-Point Arithmetic.

27. The system as recited in claim 19, wherein said processor further comprises instruction fetch logic configured to issue a first instruction from one of a plurality of threads during one execution cycle and to issue a second instruction from another one of said plurality of threads during a successive execution cycle.

* * * * *